United States Patent [19]
Harrand et al.

[11] Patent Number: 5,995,513
[45] Date of Patent: Nov. 30, 1999

[54] MULTITASK PROCESSING SYSTEM

[75] Inventors: Michel Harrand, Saint Egreve; Michel Henry, deceased, late of Le Fontanil, both of France, by Henry Claire, legal representative

[73] Assignee: SGS-Thomson Microelectronics S.A., Saint Genis, France

[21] Appl. No.: 08/525,468

[22] Filed: Sep. 8, 1995

[51] Int. Cl.$^6$ ...................................................... H04J 3/02
[52] U.S. Cl. .......................... 370/439; 711/151; 709/107
[58] Field of Search .................................. 370/362, 363, 370/364, 437–739; 395/672, 676, 677, 500; 348/402, 420, 19, 42, 43; 379/93.17; 382/236, 239; 711/151; 709/107

[56] References Cited

U.S. PATENT DOCUMENTS

| | | | |
|---|---|---|---|
| 4,418,343 | 11/1983 | Ryan et al. | 340/723 |
| 4,472,771 | 9/1984 | Bienvenu et al. | |
| 4,912,632 | 3/1990 | Gach et al. | 364/200 |
| 5,261,058 | 11/1993 | Squires et al. | 395/275 |
| 5,295,265 | 3/1994 | Ducateau et al. | 395/650 |
| 5,541,640 | 7/1996 | Larson | 348/19 |
| 5,781,788 | 7/1998 | Woo et al. | 370/278 |

FOREIGN PATENT DOCUMENTS 1529582  10/1978  United Kingdom .

OTHER PUBLICATIONS

French Search Report from French Application No. 9410822, filed Sep. 6, 1994.

Mise Au Point en <<Grandeur Reelle>> d'un Codec de Visiophone, Michel Harrand and Joseph Bulone Electronique, No. 41, p. 53, Oct. 1994 and English Translation.

1995 IEEE International Solid–State Circuits Conference, paper FA 17,4, Michel Harrand, Michel Henry et al. Feb. 17. 1995 "A Single Chip Videophone Video Encoder/Decoder".

*Primary Examiner*—Chau Nguyen
*Attorney, Agent, or Firm*—Wolf, Greenfield & Sacks, P.C.

[57] ABSTRACT

The invention relates to a multitask processing system including a data bus and a command bus. Each one of a plurality of operators is provided to perform a processing determined by an instruction and is likely to issue a command request in order to receive an instruction from the command bus and to issue a transfer request on response to an acknowledgment of the command request, in order to receive or provide data being processed, through the data bus. A memory controller arbitrates the transfer requests and manages the data transfers on the data bus between the operators and a memory. A sequencer arbitrates the command requests, determines instructions to provide the operators with, and manages the instruction transfer through the command bus.

17 Claims, 2 Drawing Sheets

MULTITASK PROCESSING SYSTEM

BACKGROUND OF THE INVENTION

1. Field of the Invention

The present invention relates to a multitask processing system where the data must be successively submitted to various processings having a certain independence from one another.

2. Discussion of the Related Art

To achieve a relatively slow multitask processing system, a microprocessor performing time shared processings is used most of the time. This solution has the advantage of being especially simple and flexible, i.e. if one of the tasks has to be modified, only a corresponding portion of a program of the microprocessor has to be modified.

For high rate tasks, a microprocessor is no longer sufficient. Completely hardwired systems, which are the fastest, can then be used. However, hardwired systems are complex and especially inflexible, i.e. if a processing is modified, the corresponding portion of the circuit has to be modified.

An intermediate solution consists of distributing the tasks between programmable digital signal processors (DSP), which allows a great flexibility. However, this solution is particularly expensive, because the digital signal processors are meant to be adapted to a great number of situations and thus have many capabilities, all of which will not be made use of in a multitask processing system.

SUMMARY OF THE INVENTION

An object of the present invention is to provide a fast, flexible, and simple multitask processing system.

In order to do this, an illustrative embodiment of the present invention provides a multitask processing system including a data bus and a command bus. Each of a plurality of operators is provided to perform a processing determined by an instruction and is likely to issue a command request in order to receive an instruction from the command bus and to issue a transfer request on response to an acknowledgment of the command request, in order to receive or supply data being processed, through the data bus. A memory controller arbitrates the transfer requests and manages the data transfers on the data bus between the operators and a memory. A sequencer arbitrates the command requests, determines instructions to supply the operators with, and manages the instruction transfer through the command bus.

According to an embodiment of the present invention, operators issue command requests to supply parameters on the command bus, the sequencer being provided to read the parameters and determine an instruction to supply an operator with according to said parameters.

According to an embodiment of the present invention, the memory controller is connected to the command bus so as to receive from the sequencer, before a transfer request is acknowledged, an instruction indicating a memory field where the memory controller has access to the data to be exchanged through the data bus with the operator having issued the transfer request.

An embodiment of the present invention can be applied to a picture processing system. In such an embodiment, the operators include a pixel input circuit for supplying the memory with pixels of a picture to be coded, a motion estimating circuit for receiving the pixels, as successive macroblocks, as well as the corresponding search windows, from the memory, and for supplying the command bus with a motion vector and a distortion allowing to determine the type of coding that a current macroblock has to undergo; a compression circuit for receiving the type of coding of the current macroblock through the command bus, receiving the current macroblock and, according to the type of coding, a predictive macroblock, from the memory, and for supplying the memory with a macroblock in intermediate format corresponding to the current compressed macroblock; and an output circuit for coded data for receiving the processed macroblocks from the memory.

According to an embodiment of the present invention, the operators include the compression circuit comprising a discrete cosine transform circuit and a quantization circuit using a quantization coefficient received from the command bus together with the type of macroblock; a variable length coding circuit (VLC) for receiving a macroblock header containing the motion vector, the quantization coefficient and the type of macroblock, for receiving the macroblock in intermediate format from the memory, for supplying the memory with coded data corresponding to the header and to the macroblock in intermediate format, and for supplying an information about the memory occupation of the coded data on the command bus; and an interface circuit with a microprocessor for supplying the microprocessor with the parameters through the command bus so that the microprocessor determines instructions or parameters to supply the operators with through the command bus.

According to an embodiment of the present invention, the parameters supplied to the microprocessor include the distortion and the memory occupation of the coded data, with which the microprocessor determines the coding selection of the following macroblocks.

According to an embodiment of the present invention, the parameters supplied to the microprocessor include the header that the microprocessor codes and supplies to the VLC circuit, said circuit being provided to receive the coded header and supply it directly before the coded data corresponding to the macroblock.

According to an embodiment of the present invention, the operators include an input circuit for coded data to supply the memory with a coded data burst; a variable length decoding circuit (VLD) for receiving a coded data burst from the memory, and for supplying the memory with a macroblock in intermediate format preceded by a header; a reconstruction circuit for receiving from the memory the macroblock in intermediate format, its header, and, according to the parameters contained in the header, a predictive macroblock, and for supplying a reconstructed macroblock corresponding to the memory; and a display circuit for receiving from the memory the picture constituted by the reconstructed macroblocks.

According to an embodiment of the present invention, the memory is a video memory supplying pixels to be displayed on the display circuit through a video bus managed by the memory controller.

The foregoing and other objects, features and advantages of the present invention will be discussed in the following description of specific embodiments, taken in conjunction with the accompanying drawings but not limited by them.

DETAILED DESCRIPTION

Figure 1:
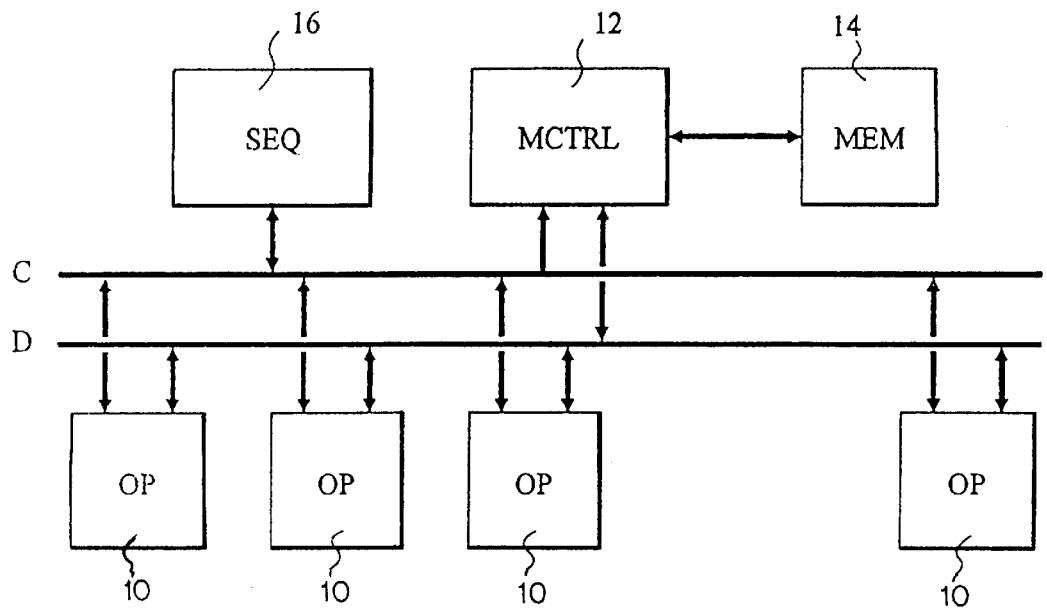
FIG. 1 shows the architecture of an embodiment of a multitask processing system according to the invention.

In FIG. 1, a multitask system according to an illustrative embodiment of the invention includes a plurality of operators 10 connected to two buses, a command bus C and a data bus D. Through bus D, managed by a memory controller 12, operators 10 exchange data being processed with a memory 14. Through bus C, managed by a sequencer 16, the operators receive processing instructions.

In the embodiment shown in FIG. 1, There are four main types of operators. A first type receives data from the outside and supplies it to memory 14, possibly after processing it. A second type receives data from memory 14, processes it in a specific way, and supplies memory 14 with the processed data. A third type receives data from memory 14 and establishes, with respect to the data received, parameters for the command bus C to supply other operators with. Finally, the fourth type receives data from memory 14 and supplies it to the outside, possibly after processing it.

For each task assigned to an operator (for example to receive or supply data or to supply parameters), the operator issues two successive requests. The first request is a command request and is issued in order to receive an instruction through command bus C. The second request is a transfer request and is issued after receiving the instruction, in order to exchange data with memory 14 through data bus D. If necessary, the data received is processed according to the instruction previously received.

Sequencer 16 is provided to arbitrate the command requests of operators 10 and supply, through command bus C, an instruction to a priority operator 10. Sequencer 16 is a multitask processor that performs, for each command request, a specific program provided to determine the instruction and supply it to the operator. Should the occasion arise, the program determines the instruction with respect to parameters previously supplied by other operators. An instruction can consist of a mere activation signal for one of the operators 10. A more complex instruction can include parameters and a specific command among several possible commands.

Memory controller 12 is provided to arbitrate the transfer requests of operators 10 and transfer a data burst, through bus D, between a priority operator 10 and memory 14, by calculating the corresponding addresses. Memory controller 12 also is a multitask processor that performs, for each transfer request, a specific program for calculating addresses and commanding data bus D. Address calculations must be fast enough, because the transfers may be practically continuous, for example at the rate of a system clock.

The activation of an operator 10 by an instruction will, in the general case, provoke a number of successive transfers of the data in a burst between the operator and memory 14. Thus, the rate at which sequencer 16 supplies instructions to the operators is low, compared to the clock rate. Accordingly, sequencer 16 can perform complex calculations that are longer than those performed by memory controller 12, for example calculations of the starting addresses of the bursts to be transferred by memory controller 12. These starting addresses are then supplied to the memory controller through command bus C, the memory controller being connected as an operator to bus C.

Additionally, command bus C can advantageously be of the data and address multiplexing type, i.e., the same bus lines are first used to present an address and then the corresponding data (instruction). This approach allows a reduction in the surface area used by the command bus.

Figure 2:
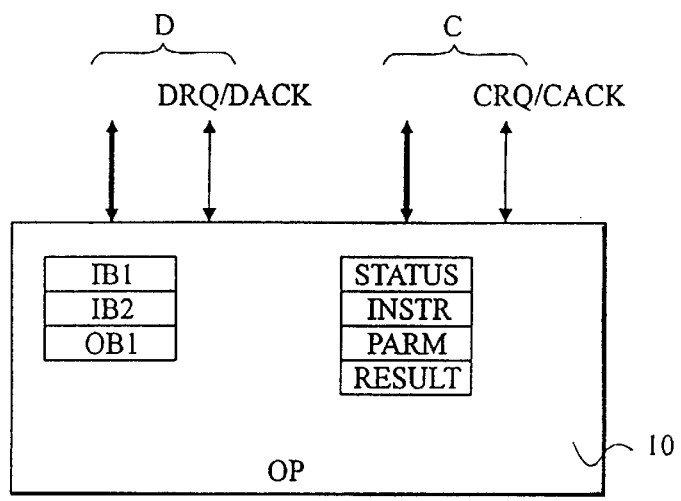
FIG. 2 shows typical elements of an operator of the system of FIG. 1.

FIG. 2 shows an example of interface of an operator 10 with buses C and D. In this example, the operator can include up to several IB input (in the example, IB1 and IB2) and OB output (in the example, OB1) buffer memories. Each of these buffer memories is accessible at a specific address through data bus D.

Operator 10 also includes a status register (STATUS), an instruction register (INSTR), possibly one or several parameter registers (PARM), and possibly one or several result registers (RESULT). The status and result registers are accessible for reading and the instruction and parameter registers for writing at specific addresses through command bus C.

In this example, the operator 10 is also provided with two request/acknowledgment systems, one of them (DRQ, DACK) being associated with data bus D, the other (CRQ, CACK) being associated with command bus C. Many request/acknowledgment systems can be considered. For instance, after supplying an instruction, sequencer 16 issues a particular address, called scrutation address. Each of the operators 10 answers the scrutation address by activating or not activating, according to whether the operator issues a request or not, a specific bit of bus C. Sequencer 16, by then reading the data present on bus C, gets to know the operators 10 issuing a request and does the arbitration, the acknowledgment consisting in supplying an instruction to the priority operator. The request/acknowledgment system associated with data bus D includes, for example, a request line DRQ for each input/output buffer memory, and a corresponding DACK acknowledgment line. When a transfer request is served by the memory controller 12, the memory controller 12 briefly activates the corresponding DACK acknowledgment line so that the operator 10 deactivates its request line.

The operation of a processing system according to the invention is generally the following. An operator that is ready to perform a task issues a command request to sequencer 16. At the time when sequencer 16 decides to serve the request, it performs a corresponding program which starts by reading the status register of the operator. The status register indicates what the operator is ready to do, for example receive a data burst. Then, the program of the sequencer determines the starting address of the burst and supplies it to memory controller 12, the address being camped-on in a buffer of the memory controller. Finally, the sequencer program activates the operator by writing an instruction in its instruction register, and if required, parameters in its parameter registers. The sequencer will be said to "load" a transfer task. Immediately, the operator 10 issues transfer requests to memory controller 12. When memory controller 12 decides to serve one of the requests, it performs a corresponding program which starts by reading the starting address camped-on in the buffer of the memory controller 12. This program then starts to transfer the burst data between the operator 10 and memory 14 at addresses calculated from the starting address. During the transfer, sequencer 16 may process a command from another operator 10.

The current transfer task in memory controller 12 can be interrupted by a priority transfer task. Then, the program being performed by memory controller 12 saves its environment and yields the command to the priority transfer program which uses a new starting address camped-on in the buffer of the memory controller. When the priority program ends, the command is yielded to the interrupted program again, which program restores its environment to proceed with the interrupted transfer.

The tasks of sequencer 16 are spaced and occupy the command bus to a small extent. Consequently, the provision of an interruption mechanism for the sequencer is not necessary, which simplifies its structure.

For a proper operation of the system according to one embodiment, data should only be transferred from the memory to an operator when the data is effectively available in the memory and the output buffer of the operator is not full. In order to achieve this, a conventional semaphore mechanism associated with each input buffer of the operators, for example, is used in the sequencer 16. When a sender program of the sequencer 16 loads a writing task in the memory of a data burst, the sequencer 16 increments a first semaphore associated with the recipient input buffer. Similarly, a second semaphore contains the number of available spaces in the output buffer of the output buffer of the recipient operator, the contents of the second semaphore being incremented by the sequencer program associated with that output buffer. Thus, before loading the task of supplying a data burst to the operator to be served, the current sequencer program checks the semaphores. If the transfer is possible, the program decrements the first semaphore of the number of data in the burst and loads the task.

A similar mechanism may be used for an operator 10 that requires to supply data, the memory field where the data must be written being checked to see if it is not full.

Some operators 10 can be provided for only supplying a result in the result register with respect to the data received. In this case, the procedure is similar to that of an operator asking to supply data, except that the sequencer then only reads the result through command bus C.

Of course, an operator can be ready to perform several tasks. In acknowledging the request of the operator, the sequencer will be in this situation due to the status register. The sequencer 16 can then load the transfer tasks one after another, according to the order of priority of the tasks.

Figure 3:
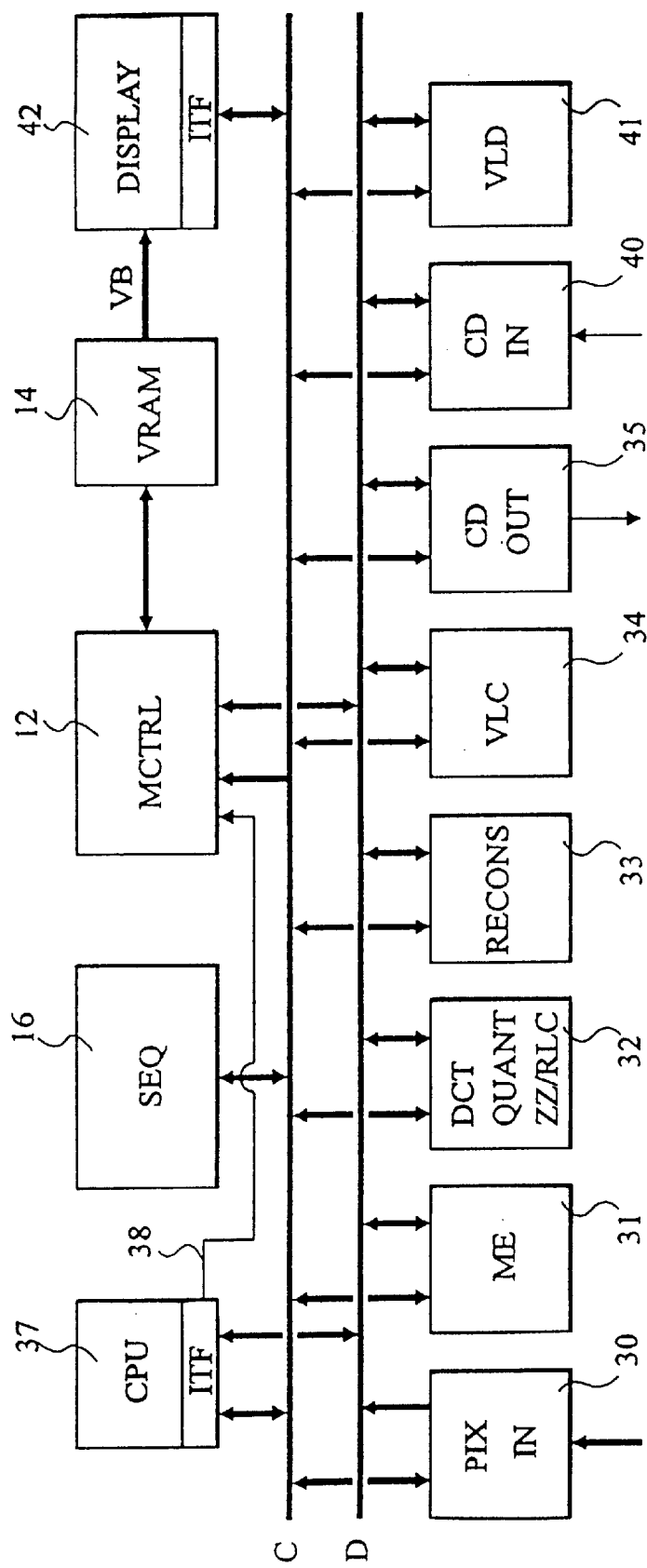
FIG. 3 shows an embodiment of a picture processing circuit according to the invention.

FIG. 3 shows an embodiment of a picture coding and decoding system made according to the architecture of the invention. The example shown is a picture coder/decoder according to standards H.261.

An operator 30 is an input circuit for data in the form of pixels. The circuit receives pixels from a device exterior to the system, for example from a camera, and can have various roles such as turning the data format provided by the camera into a data format compatible with standards H.261. Operator 30 is only provided to supply data to memory 14. The task associated with memory controller 12 is to store the pixels supplied line by line by operator 30 in a buffer field of memory 14.

An operator 31 is a motion estimator which receives the pixels previously supplied by operator 30 to the memory. The pixels are received macroblock by macroblock, each macroblock including chroma and luma arrays corresponding to a picture square of 16×16 pixels. For each macroblock, motion estimator 31 receives a corresponding search window read in the memory field where a previously coded picture has been rebuilt. The role of motion estimator 31 is to find in the search window the closest predictive macroblock possible to the macroblock being processed. Once the predictive macroblock is found, the motion estimator supplies a vector to determine the position of the predictive macroblock and supplies parameters, especially a "distortion", allowing to appraise the similarity between the predictive macroblock and the macroblock being processed.

Thus, operator 31 includes two input buffers coupled to bus D (for respectively receiving the macroblocks being processed and the corresponding search windows) and supplies a result (through a result register) on command bus C, more particularly a motion vector and a distortion. Besides, the motion estimator 31 can receive several instructions and parameters through the command bus. For example, when the macroblock being processed is far from the picture edges, the processing is normal, that is, a search windows always defined in the same way is used. However, when the macroblock is close to the picture edges, the search window is truncated. In this case, motion estimator 31 receives, for instance, an instruction indicating not to proceed to a search outside the truncated window.

An operator 32 is a compression circuit performing a discrete cosine transform (DCT), a quantization (QUANT), a zigzag scan (ZZ), and the coding of the length of a string of zeros (RLC). Operator 32 is meant to perform several functions according to the result of an analysis of the parameters previously supplied by motion estimator 31. The analysis is, for example, performed by sequencer 16 at the time of its reading the parameters in the motion estimator. The instruction supplied to operator 32 after the analysis indicates that the macroblock being processed must undergo an "intra" or "predicted" coding.

According to the "intra" coding, operator 32 receives the only macroblock being processed which is successively submitted to the discrete cosine transform and the quantization. A macroblock in an intermediate format is thus obtained and stored in a buffer field in memory 14.

According to the predicted coding, operator 32 receives the macroblock being processed as well as the corresponding predicted macroblock. The two macroblocks are subtracted and the difference macroblock is submitted to the cosine transform and the quantization to provide the macroblock in intermediate format.

Operator 32 receives for each macroblock, as a parameter, a quantization coefficient. This quantization coefficient is, for example, calculated by sequencer 16.

Thus, operator 32 includes two input buffers, for the macroblock being processed and the predictive macroblock, respectively, and an output buffer to provide the macroblocks in intermediate format. To supply operator 32 with a predictive macroblock, memory controller 12 is initialized with a starting address calculated by sequencer 16 with respect to the motion vector previously supplied by motion estimator 31.

The various parameters necessary for the processing of each macroblock (type, motion vector, quantization coefficient . . . ) are gathered by operator 32 in a header which is inserted before the corresponding macroblock in intermediate format and written together with said corresponding macroblock in intermediate format in memory 14.

An operator 33 is a reconstruction circuit performing operations opposite to those performed by operator 32. The role of the reconstruction circuit is to reconstitute the picture being coded as it will be once it is decoded. The predictive macroblocks of the following picture will be retrieved from the reconstructed picture. Reconstruction circuit 33 includes two input buffers to respectively receive a macroblock in intermediate format and a corresponding predictive macroblock, and an output buffer to supply the reconstructed macroblocks. Reconstruction circuit 33 finds the parameters it requires in the headers preceding the macroblocks in intermediate format.

An operator 34 is a variable length coding circuit (VLC). This operator 34 is meant to receive the macroblocks in intermediate format and to supply the corresponding final coded data. The headers preceding the macroblocks in intermediate format must also be coded at the output of VLC circuit 34. Besides, various other headers, following one another less frequently, for example at each picture, must be inserted.

A first approach consists of providing the VLC circuit 34 to perform the coding of the headers.

However, as the codings of headers are complex but repeated with a relatively low frequency, it is particularly convenient to perform the codings by means of software, for example by sequencer 16 or, preferably, by an external microprocessor.

Thus, VLC circuit 34 includes an input buffer for receiving the macroblocks in intermediate format and an output buffer to supply the coded data. In the case where the headers are coded by an external microprocessor, they are supplied on bus D to a second input buffer of VLC circuit 34 by a transition, like all the data of bus D, through a buffer field of memory 14. This is discussed in detail further on. VLC circuit 34 starts with concatenating the significant parts of the coded header together and, afterwards, begins to code the corresponding macroblock in intermediate format.

Operator 34 also supplies results that are the number of bits of the coded data corresponding to the macroblock just processed and the occupation of the field of memory 14 affected to this coded data. This occupation is used to determine the coding selection (the type and the quantization coefficient Q) of the following macroblocks.

An operator 35 is an output circuit for coded data. This operator 35 includes an input buffer for receiving the data coded by VLC circuit 34 and supplies this data serially on an output line of the system. According to standards H.261, it also performs a framing and an insert of error correction codes.

In one embodiment, the system includes an external microprocessor 37. Said microprocessor is linked to command bus C and data bus D through an interface circuit ITF. Said microprocessor is, for example, the one that manages the device containing the picture processing system. Due to the interface circuit ITF, microprocessor 37 essentially operates like any operator linked to the system. In fact, microprocessor 37 assists sequencer 16 in performing some complex calculations described hereafter as examples.

When motion estimator 31 has found a predictive macroblock, it supplies sequencer 16 with, notably, the components of the motion vector and the distortion. There remains, from the distortion, to make a decision concerning the type of coding for the macroblock being processed. The decision is made according to criteria which change from one user to another. For this reason, it is especially useful for the decision to be performed by the microprocessor 37 so that the user be able to easily program the criteria he desires to use. Of course, sequencer 16 also carries out programs, but the programs are preferably stored in an internal ROM memory to which the user has no access. Thus, when sequencer 16 has read the distortion supplied by the motion estimator, it immediately supplies said distortion and a corresponding instruction to the interface of microprocessor 37. The interface interrupts the microprocessor 37 which then reads the distortion and takes the decision. When the decision is made, the microprocessor 37 writes it in the interface which issues a request to sequencer 16. Sequencer 16 then reads the decision and transmits it to operator 32.

The microprocessor 37 is also in charge of calculating the quantization coefficients to supply to operator 32, since there are also many ways of calculating the quantization coefficient, which change from an operator to another. In order to do this, sequencer 16 supplies to the interface of microprocessor 37, together with the distortion, the number of bits corresponding to the previously coded macroblock and the memory occupation of the coded data, supplied by VLC circuit 34. Thus, microprocessor 37 calculates at once the decision and the quantization coefficient.

The coding of headers may also be performed by the microprocessor 37, which is especially useful since the headers can include private data inserted by the user, as for example a text to be displayed on the picture, or stuffing bits if the memory occupation of the coded data is not sufficient.

For the coding of the headers, memory controller 12 is provided to transfer the headers supplied by operator 32 in the interface of microprocessor 37 as well as in memory 14. Microprocessor 37 is then interrupted, fetches the header, inserts, if necessary, private data, codes the header and writes the resulting coded header in the memory and an instruction in the interface. The addresses at which the words of the headers are written are supplied by microprocessor 37 to memory controller 12 through a bus 38. The interface then issues a request to sequencer 16 which transmits the instruction to VLC circuit 34 through command bus C.

Bus 38, providing an external access to memory 14, can be used for various other tasks independent of the coding/decoding, as for example filling a memory field with an external picture to be superimposed to the picture in display. A display controller described hereafter will then be able to read the picture in display and the external picture to display them simultaneously.

The microprocessor manages the memory occupation of the coded data by affecting the coding selection (type of macroblock, quantization coefficient). This allows to easily reprogram the selection algorithm so as to obtain a good compromise between the picture quality and its transmission time. As a matter of fact, the more coded data in waiting for transmission can be stored, the more the quality is improved, but the longer the transmission time is. A high transmission time matters little for television, but is a nuisance in a videophone.

The system described up to now corresponds to a coding system. Elements that have not been described yet correspond to a decoding system.

The decoding system includes an operator 40 which is an input circuit for coded data receiving data from the outside on a serial line. Operator 40 includes an output buffer to supply memory 14 with the coded data. This operator is similar to operator 30 previously described as far as its connection with buses C and D is concerned. According to standards H.261, it must further perform a frame synchronization and an error correction.

An operator 41 is a circuit performing a variable length decoding (VLD). This operator includes an input buffer for receiving from the memory the data previously coded by operator 40 and an output buffer for supplying the memory with macroblocks in intermediate format, similar to those supplied by operator 32 in a coding, preceded by headers.

The macroblock in intermediate format is then supplied, together with its header, to reconstruction circuit 33 which then has all the parameters necessary for processing the macroblock. Thus, reconstruction circuit 33 is used for both coding and decoding. The coding and the decoding are discriminated by the starting addresses that sequencer 16 supplies to memory controller 12. If a coding and a decoding are under way at the same time, sequencer 16 alternatively assigns reconstruction circuit 33, for example, to the coding and the decoding.

The macroblocks reconstructed by circuit 33 are supplied to memory 14 to constitute a picture to be displayed which will be used to search for predictive macroblocks serving to reconstruct the macroblocks of the following picture.

The pixels of the reconstructed picture are supplied to a display controller 42 linked to command bus C by an interface circuit ITF. In this example, the pixels are supplied to display controller 42 by a video bus VB of memory 14 which in this case is a video memory. Display controller 42, via its interface, acts as an operator. At picture inception, it issues a request to sequencer 16 so that said sequencer initializes memory controller 12 with the starting address of the picture to be displayed. Then, when it needs data, it issues a request to memory controller 12 which answers the request by preparing a data burst in memory 14, that display controller 42 will be able to sequentially read through video bus VB. Display controller 42 is, for example, circuit Sti1101 commercialized by SGS-Thomson.

The output and input circuits 35 and 40 for coded data can be provided to respectively perform a framing and a deframing meant to correct transmission errors.

Memory 14 includes several picture storage fields, i.e. a field for storing an input picture (output of operator 30), a field for storing the picture reconstructed in the coding, and a field for storing two pictures reconstructed in the decoding (one of them in display, and the other being reconstructed).

Aside from these three picture fields, the memory includes buffer fields, i.e. one for storing the macroblocks in intermediate format supplied by operator 32, one for storing the coded data camped-on for output by operator 35, one for storing the coded data coming through operator 40, and one for storing the macroblocks in intermediate format supplied by operator 41.

In order to code and decode pictures at format QCIF (176×144 pixels), which is the picture format which will be used in the videophone, the system requires 198 Kbytes for the three picture fields. The smallest commercially available memory size above 198 Kbytes is 256 Kbytes, which allows to advantageously use the remaining 58 Kbytes to make the various buffer fields.

Having thus described at least one illustrative embodiment of the invention, various alterations, modifications, and improvements will readily occur to those skilled in the art. Such alterations, modifications, and improvements are intended to be part of this disclosure, and are intended to be within the spirit and the scope of the invention. Accordingly, the foregoing description is by way of example only and is not intended to be limiting. The invention is limited only as defined in the following claims and the equivalent thereto.

What is claimed is:

1. A multitask processing system comprising:

a data bus;

a command bus;

a plurality of operators, each of the plurality of operators being coupled to the data bus and the command bus, wherein one operator of the plurality of operators is capable of performing a process determined by an instruction received on the command bus, the instruction being received in response to a command request issued by the one operator, the one operator being further capable of issuing a transfer request for transferring data, in response to an acknowledgment of the command request received by the one operator;

a memory controller, coupled to the data bus, having an input that receives the transfer request and a second transfer request from another of the plurality of operators, the memory controller performing an arbitration between the transfer request and the second transfer request and having an output that manages data transfers on the data bus between the plurality of operators and a memory in accordance with the arbitration; and a sequencer, coupled to the data bus and the command bus, having an input that receives the command request and a second command request from another of the plurality of operators, the sequencer performing an arbitration between the command request and the second command request and determining instructions to supply to the plurality of operators, the sequencer having an output that manages a transfer of the instructions through the command bus to the plurality of operators in accordance with the arbitration between the command request and the second command request.

2. The multitask processing system of claim 1, wherein at least one of the plurality of operators has an output that provides a command request for supplying parameters to the command bus, the input of the sequencer receiving the parameters, the output of the sequencer providing to another of the plurality of operators the parameters and an instruction corresponding to the parameters.

3. The multitask processing system of claim 2, wherein the memory controller is coupled to the command bus, the memory controller receiving from the sequencer, prior to an acknowledgment of the transfer request, an instruction indicating a memory field of the memory that contains data to be exchanged through the data bus with the operator that issued the transfer request.

4. The multitask processing system of claim 3, wherein the multitask processing system is a picture processing system in which:

a first operator of the plurality of operators is a pixel input circuit for supplying the memory with pixels of a picture to be coded;

a second operator of the plurality of operators is a motion estimating circuit, having an input that receives from the memory pixels of a current macroblock of a series of successive macroblocks that make up the picture to be coded, and search windows corresponding to the pixels of the current macroblock, and an output that provides to the command bus a motion vector and a distortion, the distortion being indicative of a type of coding to be performed on the current macroblock;

a third operator of the plurality of operators is a compression circuit having an input that receives through the command bus the motion vector and a type of coding, the pixels of the current macroblock from the memory, and a predictive macroblock of the series of successive macroblocks from the memory, in accordance with the type of coding to be performed, and an output that provides the memory with a macroblock in intermediate format and a coded header; and a fourth operator of the plurality of operators is an output circuit having an input that receives a processed macroblock corresponding to the macroblock in intermediate format from the memory, and an output that provides coded data corresponding to the processed macroblock.

5. The multitask processing system of claim 4, wherein:

the compression circuit includes a discrete cosine transform circuit having an input that receives the current macroblock and an output that provides a transformed macroblock, the compression circuit further including a quantization circuit having an input that receives a quantization coefficient across the command bus and the transformed macroblock, and an output that provides the macroblock in intermediate format to the memory;

a fifth operator of the plurality of operators is a variable length coding circuit, having an input that receives a macroblock header, the quantization coefficient, and the type of macroblock from the command bus, the input further receiving the macroblock in intermediate form from the memory, the fifth operator having an output the supplies the memory with coded data corresponding to the macroblock header, the quantization coefficient, the type of macroblock and the macroblock in intermediate form, the output further supplying the command bus with information regarding an amount of memory occupied by the coded data;

the processed macroblock corresponding to the macroblock in intermediate format received by the output circuit includes the coded data provided to the memory from the variable length coding circuit; and a sixth operator of the plurality of operators is an interface circuit, coupled to a microprocessor, the interface circuit providing the microprocessor with parameters through the command bus so that the microprocessor may determine instructions or parameters to supply operators with through the command bus.

6. The multitask processing system of claim 5 wherein the parameters supplied to the microprocessor include the distortion and the amount of memory occupied by the coded data, the microprocessor determining the type of coding of macroblocks, of the series of successive macroblocks that have not yet been processed, and providing the type of coding to the command bus in response to the distortion and the amount of memory.

7. The multitask processing system of claim 5 wherein the parameters supplied to the microprocessor include the macroblock header, the microprocessor coding the header to create a coded header and providing the coded header to the variable length coding circuit, the variable length coding circuit supplying the coded header with the coded data corresponding to the macroblock.

8. The multitask processing system of claim 3, wherein the multitask processing system is a picture processing system in which:

a first operator of the plurality of operators is an input circuit containing coded data, the input circuit having an output that provides the memory with a coded data burst corresponding to at least some of the coded data;

a second operator of the plurality of operators is a variable length decoding circuit having an input that receives the coded data burst from the memory, and an output that supplies the memory with a macroblock in intermediate format preceded by a header;

a third operator of the plurality of operators is a reconstruction circuit having an input that receives from the memory the macroblock in intermediate format the header, and a predictive macroblock according to parameters contained in the header; and an output that supplies the memory with a reconstructed macroblock corresponding to the predictive macroblock and the macroblock in intermediate format; and a fourth operator of the plurality of operators is a display circuit, having an input that receives the reconstructed macroblock from the memory and an output that provides a picture determined by the reconstructed macroblock.

9. The multitask processing system of claim 7, wherein the memory is a video memory having an output that provides the display circuit with pixels to be displayed, the pixels to be displayed being provided through a video bus that is managed by the memory controller.

10. A method for controlling a plurality of operators to operate as a multitask system, comprising the steps of:

receiving a command request from a first operator of the plurality of operators, the command request being indicative that the first operator is ready to perform a task;

loading a task into the first operator; and performing, by the first operator, the task that was loaded into the first operator;

wherein the step of performing includes the steps, performed by the first operator, of:
issuing a data transfer request;
receiving a data transfer acknowledgment; and
receiving data from a memory the data corresponding to the data transfer request;
further comprising the steps, performed by a memory controller, of:
receiving the data transfer request;
receiving a second data transfer request from a second operator of the plurality of operators;
arbitrating between the data transfer request and the second data transfer request to determine that the data transfer request is a priority request; and
providing the data transfer acknowledgment to the first operator.

11. A method for controlling a plurality of operators to operate as a multitask system, comprising the steps of:

receiving a command request from a first operator of the plurality of operators, the command request being indicative that the first operator is ready to perform a task;

loading a task into the first operator; and performing, by the first operator, the task that was loaded into the first operator;

wherein the step of performing includes the steps, performed by the first operator, of:
issuing a data transfer request;
receiving a data transfer acknowledgment; and
receiving data from a memory, the data corresponding to the data transfer request;
further comprising the steps, performed by a memory controller, of:
receiving a priority data transfer request from a second operator of the plurality of operators;
pausing the step of the first operator receiving data from the memory;
causing the second operator to receive data corresponding to the priority data transfer request from the memory; and
resuming the step of the first operator receiving data from the memory.

12. A method for controlling a plurality of operators to operate as a multitask system, comprising the steps of:

receiving a command request from a first operator of the plurality of operators, the command request being indicative that the first operator is ready to perform a task;

loading a task into the first operator; and performing, by the first operator, the task that was loaded into the first operator;

wherein the step of performing includes the steps of:
  receiving data from a memory;
  processing the data, to determine parameters to be used by a second operator of the plurality of operators; and
  supplying the second operator with the parameters.

13. An apparatus comprising:
a plurality of operators, coupled together;
means for receiving a command request from a first operator of the plurality of operators, the command request being indicative that the first operator is ready to perform a task; and
means for loading a task into the first operator;
wherein the first operator includes means for performing the task that was loaded into the first operator;
wherein the first operator further includes:
  means for issuing a data transfer request;
  means for receiving a data transfer acknowledgment;
  means for receiving data from a memory, the data corresponding to the data transfer request;
  further comprising a memory controller, the memory controller including:
    means for receiving the data transfer request;
    means for receiving a second data transfer request from a second operator of the plurality of operators;
    means for arbitrating between the data transfer request and the second data transfer request to determine that the data transfer request is a priority request; and
    means for providing the data transfer acknowledgment to the first operator.

14. An apparatus comprising:
a plurality of operators coupled together;
means for receiving a command request from a first operator of the plurality of operators, the command request being indicative that the first operator is ready to perform a task; and
means for loading a task into the first operator;
wherein the first operator includes means for performing the task that was loaded into the first operator;
wherein the first operator further includes:
  means for issuing a data transfer request;
  means for receiving a data transfer acknowledgment;
  means for receiving data from a memory, the data corresponding to the data transfer request;
  further comprising a memory controller, the memory controller including:
    means for receiving a priority data transfer request from a second operator of the plurality of operators;
    means for pausing the means for receiving data from the memory;
    means for causing the second operator to receive data corresponding to the priority data transfer request from the memory; and
    means for resuming the means for receiving data from the memory.

15. An apparatus comprising:
a plurality of operators coupled together;
means for receiving a command request from a first operator of the plurality of operators, the command request being indicative that the first operator is ready to perform a task; and
means for loading a task into the first operator;
wherein the first operator includes means for performing the task that was loaded into the first operator;
wherein the means for performing includes:
  means for receiving data from a memory;
  means for processing the data, to determine parameters to be used by a second operator of the plurality of operators; and
  means for supplying the second operator with the parameters.

16. A multitask processing system comprising:
a plurality of operators coupled together;
a sequencer, coupled to each of the plurality of operators, the sequencer having an input that receives a command request from a first operator of the plurality of operators, the command request being indicative that the first operator is available to perform a task, the sequencer further having an output that loads a task into the first operator, so that the first operator performs the task;
wherein the first operator further includes:
  means for issuing a data transfer request;
  means for receiving a data transfer acknowledgment; and
  means for receiving data from a memory, the data corresponding to the data transfer request;
  further comprising a memory controller, the memory controller including:
    an input that receives the data transfer request from the first operator and a second data transfer request from a second operator of the plurality of operators;
    a data transfer arbitrator, receiving the data transfer request and the second data transfer request and providing a determination that the data transfer request is a priority request; and
    an output, that provides the data transfer acknowledgment to the first operator.

17. A multitask processing system comprising:
a plurality of operators coupled together;
a sequencer, coupled to each of the plurality of operators, the sequencer having an input that receives a command request from a first operator of the plurality of operators, the command request being indicative that the first operator is available to perform a task, the sequencer further having an output that loads a task into the first operator, so that the first operator performs the task;
wherein the first operator further includes:
  means for issuing a data transfer request;
  means for receiving a data transfer acknowledgment; and
  means for receiving data from a memory, the data corresponding to the data transfer request;
  further comprising a memory controller, the memory controller including:
    an input that receives a priority transfer request from a second operator of the plurality of operators;
    a first output that pauses the means for receiving data;
    a second output that causes the second operator to receive data corresponding to the priority data request from the memory; and
    a third output that causes the means for receiving data to resume.

* * * * *